United States Patent [19]

Evans et al.

[11] Patent Number: 5,799,437

[45] Date of Patent: Sep. 1, 1998

[54] CUT PLANT WATERING APPARATUS

[76] Inventors: Gary Evans, 909 Pike Ave, Attleboro, Mass. 02703; John O'Hearn, 85 Burlington Ave., Wilmington, Mass. 01887

[21] Appl. No.: 683,234

[22] Filed: Jul. 18, 1996

[51] Int. Cl.[6] .................................................. A47G 7/02
[52] U.S. Cl. .......................................... 47/40.5; 340/618
[58] Field of Search ................................ 47/40.5, 48.5; 340/620, 618

[56] References Cited

U.S. PATENT DOCUMENTS

| | | | |
|---|---|---|---|
| 3,781,840 | 12/1973 | Roberts et al. | 340/245 |
| 4,653,224 | 3/1987 | Weckesser | 47/40.5 |
| 4,796,017 | 1/1989 | Merenda | 340/620 |
| 4,825,587 | 5/1989 | Stancil | 47/40.5 |
| 4,850,137 | 7/1989 | Foster | 47/79 |
| 4,930,252 | 6/1990 | Krause et al. | 47/40.5 |
| 4,993,176 | 2/1991 | Spinosa | 47/40.5 |
| 5,054,236 | 10/1991 | Sands | 47/79 |
| 5,076,009 | 12/1991 | Cibor | 47/40.5 |
| 5,157,868 | 10/1992 | Munoz | 47/40.5 |
| 5,267,412 | 12/1993 | Bergin | 47/48.5 |
| 5,349,997 | 9/1994 | Rial | 141/331 |
| 5,363,591 | 11/1994 | Jones | 47/40.5 |
| 5,369,910 | 12/1994 | Copenhaver | 47/40.5 |
| 5,410,839 | 5/1995 | Granger | 47/40.5 |
| 5,428,348 | 6/1995 | Gault | 340/618 |
| 5,473,838 | 12/1995 | Denbigh | 47/40.5 |
| 5,493,277 | 2/1996 | Pierce et al. | 47/40.5 |
| 5,513,677 | 5/1996 | McCurry | 47/40.5 |
| 5,615,516 | 4/1997 | Brown | 47/40.5 |

*Primary Examiner*—Michael J. Carone
*Assistant Examiner*—Joanne C. Downs
*Attorney, Agent, or Firm*—Louis J. Franco

[57] ABSTRACT

An improved cut plant watering apparatus for detecting and indicating a predetermined water fill level to prevent overfilling and spillage when watering a cut plant, such as a Christmas tree, mounted in a container comprising a conduit for carrying water from a fill location to the container, an indicator in communication with and responsive to a detector that, when used to fill the container with water, indicates that the predetermined water level has been reached so that a person does not inadvertently overfill the container, thereby eliminating water damage to surrounding objects or to the carpet and floor.

13 Claims, 7 Drawing Sheets

CUT PLANT WATERING APPARATUS

FIELD OF THE INVENTION

This invention relates generally to a cut plant watering apparatus, and more particularly to an improved apparatus for detecting and indicating a water fill level for preventing overfilling when watering a cut plant mounted in a container from a remote location with respect to the container.

BACKGROUND OF THE INVENTION

It is well known that watering cut plants, especially Christmas trees, can be inconvenient. Typically the cut Christmas tree is mounted on a stand that includes a container for holding water so that the tree can remain fresh without prematurely drying out during the holiday season. Periodic attempts to water the tree require that water be carefully poured into the container which is usually obstructed by closely spaced tree limbs, decorations and gifts. Usually, a drinking glass or other similar container is used for this procedure which invariably results in water spillage due to overfilling and damage to surrounding objects or to the carpet and floor. This occurs because a person can not readily ascertain, due to the previously mentioned obstructions, when the container is filled to a level below the top of the container.

An alternative and better method for filling the cut plant water container which overcomes the mentioned shortcomings is to provide a cut plant watering apparatus that utilizes a conduit for carrying water to the container from a remote and more convenient location with respect to the container, a detector that is activated when contacted by the water as it rises within the container during filling, and a fill level indicator distally positioned from and in communication with the detector for indicating when the water has reached a predetermined water fill level. When the watering apparatus is installed on a Christmas tree mounted in a tree stand with a water container, for example, it provides a convenient watering means extending from the perimeter of the Christmas tree to the water container at the base of the tree while preventing water overflow and eliminating the need to crawl under the tree.

This application requires a convenient apparatus that is preferably simple to utilize and manufacture. Prior attempts to provide watering and indicating devices for a variety of applications have been made, but not specifically for conveniently detecting and indicating the water fill level when watering a Christmas tree from a remote location with respect to the container in the manner of the invention disclosed herein. Several examples of prior attempts are discussed below.

U.S. Pat. No. 5,076,009 to Cibor shows a Christmas tree watering system using a funnel placed in the head of a Santa Claus ornament and a tube plus a water level float valve control.

U.S. Pat. No. 4,796,017 to Merenda shows a low water alarm for a Christmas tree stand having a fluid sensing wire probe connected to a battery operated circuit that activates an alarm with lights and sound using a hook for hanging it on a Christmas tree to detect a low water level in the Christmas tree stand reservoir. However, Merenda discloses no means for conveniently filling the water container from a remote location. U.S. Pat. No. 5,428,348 to Gault performs substantially the same function as U.S. Pat. No. 4,796,017 to Merenda, but also lacks a means for conveniently filling the water container from a remote location.

U.S. Pat. No. 3,781,840 to Roberts et al shows an instrument for guiding the blind in filling open-top vessels having water level electrodes, a dc-power source, a connecting circuit, and an audible alarm responsive to the liquid fill level.

U.S. Pat. No. 4,993,176 Spinosa shows an ornamental reservoir and tube watering device that operates on the principal of pressure differentials.

U.S. Pat. No. 5,349,997 to Rial discloses a device having a segmented rigid conduit in combination with a funnel for adding water to hard-to-reach watering stands for indoor trees. However, no convenient means for determining when the desired water fill level has been reached is disclosed or claimed by Rial.

U.S. Pat. No. 5,410,839 to Granger shows a Christmas tree watering funnel with an indicating light and float that relies on cumbersome mechanical linkage for communication between the detecting means and indicating lamp to indicate to a user when the water level has fallen below a certain desired minimum.

Reservoir plant and Christmas tree watering systems including passive systems are shown in U.S. Pat. Nos. 5,363,591 to David A. Jones; No. 5,157,868 to Munoz; No. 4,930,252 to Krause, et al; No. 4,653,224 to Weckesser; No. 4,825,587 to Stancil; and No. 5,369,910 to Copenhaver.

U.S. Pat. No. 5,054,236 to Sands discloses a reservoir, a conduit, and a valve with a check ball.

None of the patents listed above discloses a device that conveniently detects and indicates the water fill level during watering of a Christmas tree that allows a user to fill the water container from a remote location in the manner of the invention disclosed herein.

Accordingly, there is a great need for a device that can conveniently and practically indicate the water fill level when remotely watering a cut plant mounted in a container without the risk of overfilling. Such a device is preferably manufactured at a low cost and is simple to assemble and use.

SUMMARY OF INVENTION

It is therefore a primary object of this invention to provide an improved apparatus for filling a cut plant water container, particularly a Christmas tree stand, from a remote and convenient location.

It is a further object of this invention to provide a cut plant watering apparatus that indicates when the water has reached a desired, predetermined level within the container to prevent overfilling.

It is still another object of this invention to provide a cut plant watering apparatus that is aesthetically pleasing.

It is a further object of this invention to provide a cut plant watering apparatus that is simple in design and manufacture and easy and fun to use.

This invention results from the realization that there is a great need for an efficient, convenient, practical, low cost cut plant watering apparatus that indicates to a user when a predetermined water fill level has been reached during filling. The invented apparatus includes a conduit, which is preferably flexible, with a top open end and a bottom open end. The top open end is coupled to a funnel for receiving and directing water into the conduit. A fill level indicator such as a lamp, electric piezo buzzer, sound module and speaker, or any other electrically activated visible and/or audible indicator element is provided and disposed at or near the top open end of the conduit. Audible and visible elements could both be provided. The fill level indicator(s) is part of a normally open electrical circuit which includes an electrical power source. When the circuit is closed, the fill level indicator is activated and indicates that water has reached the predetermined water fill level.

The fill level indicator is electrically connected to a water fill level detector located in the container at or near the bottom open end of the conduit. The detector comprises a primary electrode and a counter electrode disposed in spaced, parallel relationship and extending downwardly into the container. The electrodes are disposed at the level within the container to which water is to be brought in filling it. When the water has reached the desired fill level, the electrodes are bridged by the water and the electrical circuit is closed thereby activating the fill level indicator.

BRIEF DESCRIPTION OF THE DRAWINGS

The objects and features of the present invention, which are believed to be novel, are presented with particularity in the claims appended hereto. The above and further objects and advantages of the present invention are best understood through the following description in combination with the accompanying drawings, in which:

DISCLOSURE OF THE PREFERRED EMBODIMENT

Figure 1:
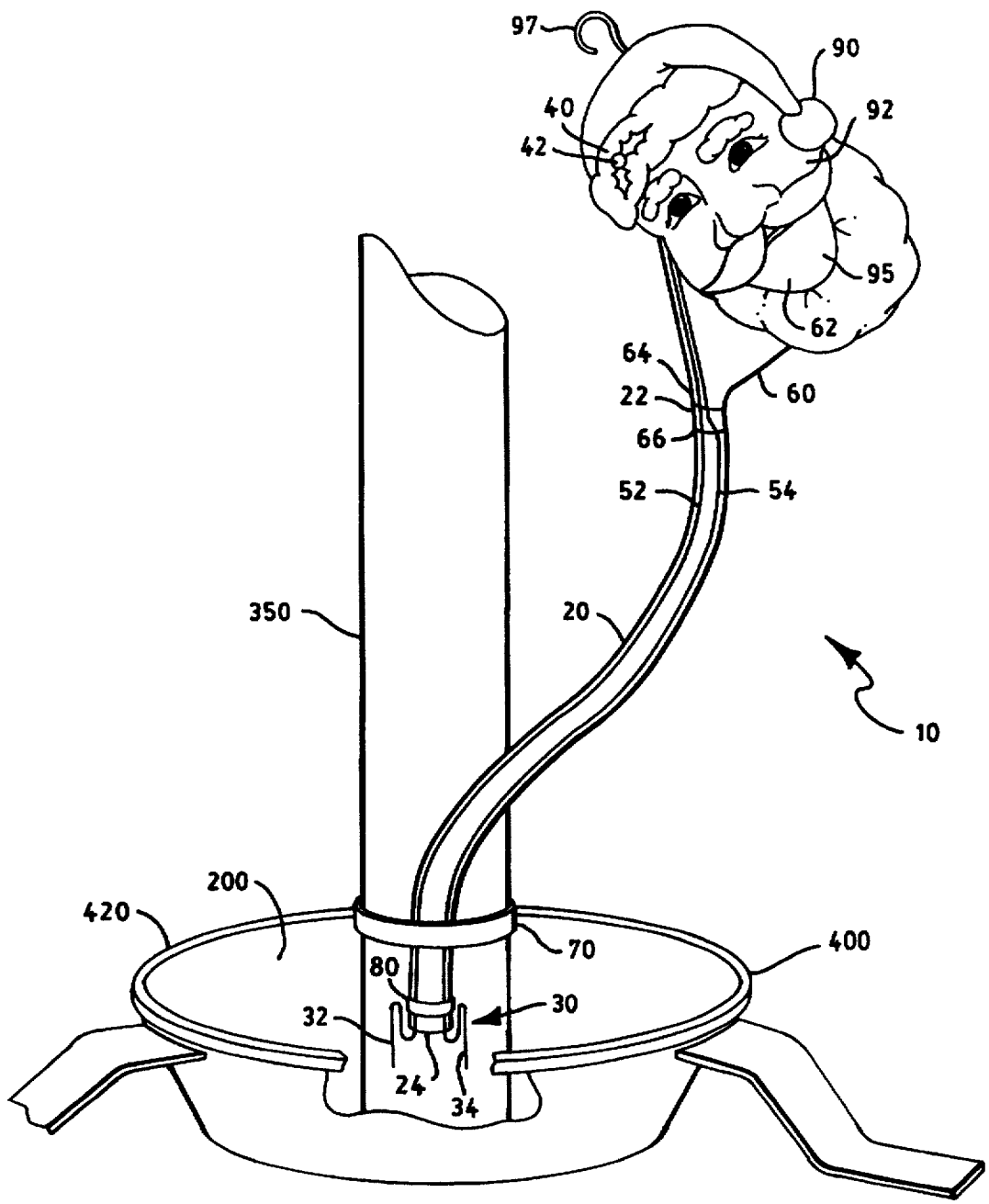
FIG. 1 is a front view of a preferred embodiment of the present invention.

There is shown in FIG. 1 a cut plant watering apparatus 10 according to a preferred embodiment of the present invention. Cut plant watering apparatus 10 comprises a support panel 90, a funnel 60, a conduit 20, which is preferably flexible, a fastener 70 for maintaining the discharge end 24 of conduit 20 in container 420, a fill level detector 30 and a fill level indicator 40.

When in use, cut plant watering apparatus 10 is mounted on a limb and on a trunk 350 of a cut plant 300 such as a Christmas tree. Cut plant 300 is mounted in a container 420 and supported by a tree stand 400. To water cut plant 300, water 200 is introduced through a front face 92 of support panel 90 via an opening 95 therethrough. A funnel 60 attached to rear face 93 (see FIG. 4) of panel 90 directs incoming water 200 to conduit 20. Conduit 20 then carries water 200 to container 420. The filling process continues until water 200 in container 420 reaches a predetermined depth below the top of container 420 at which point water 200 contacts primary electrode 32 and counter electrode 34 of fill level detector 30 thereby bridging electrodes 32 and 34 and completing electrical circuit 51 shown in FIGS. 4, 6 and 7.

Funnel 60 could be excluded in which case conduit 20 would be attached to rear face 93 of support panel 90 to permit filling through opening 95. Furthermore, water filling could also be accomplished by pouring water directly into conduit 20 without support panel 90 or funnel 60. Also, there are numerous devices well known in the art for performing the function of fill level detector 30 and it need not comprise electrodes 32 and 34 as described. For example, fill level detector 30 could be a float switch which is open or closed depending on the water level or a mechanism having a light emitter and a light detector wherein the flux of light between the emitter and light detector is interrupted by the rising water level to close the circuit. Other devices for achieving the function of closing circuit 51 in response to the water level will occur to those skilled in the art and are within the intended scope of this invention.

Figure 4:
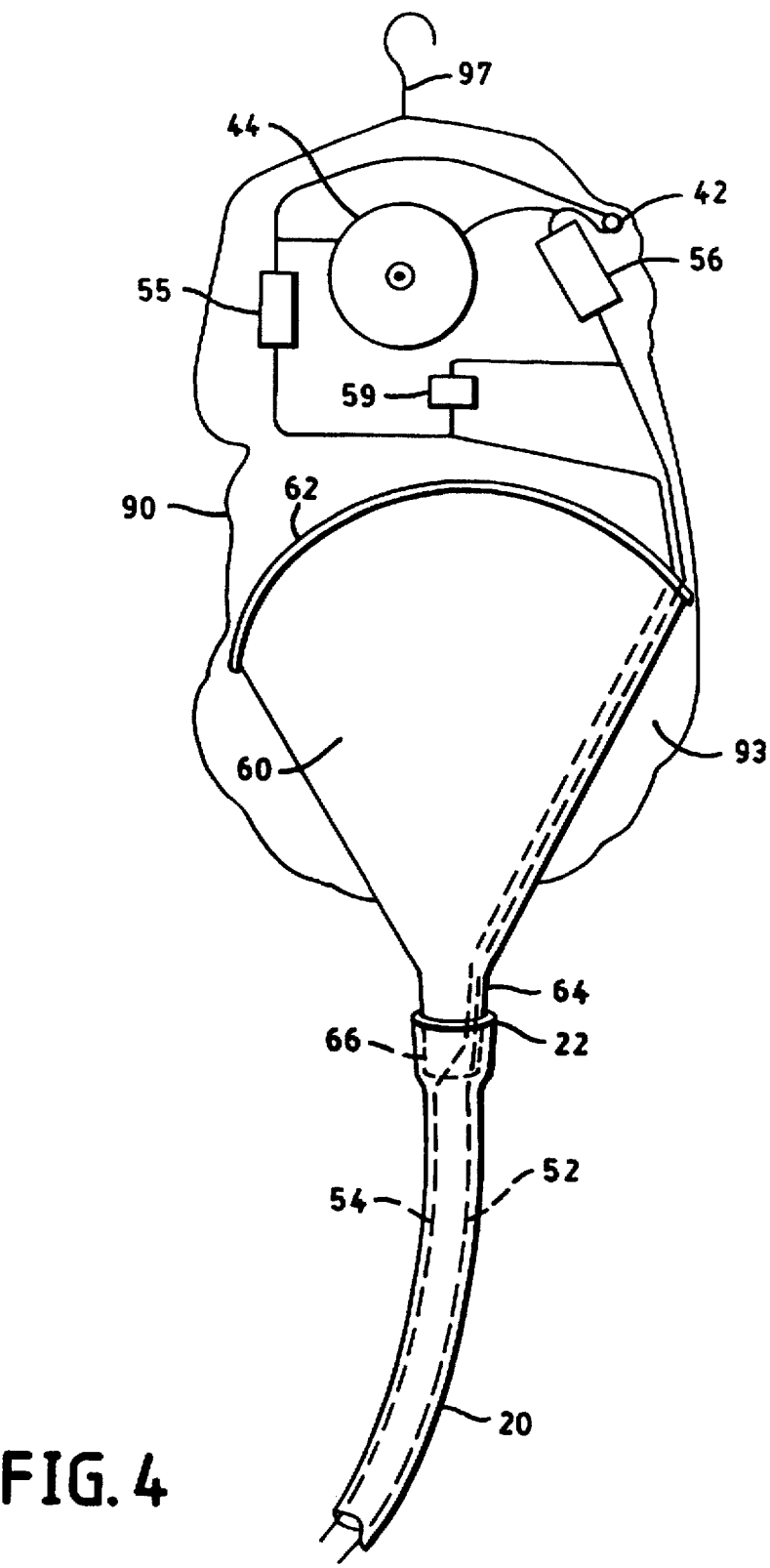
FIG. 4 shows a view of the preferred embodiment of the cut plant watering apparatus from the rear side of the support panel.
Figure 5:
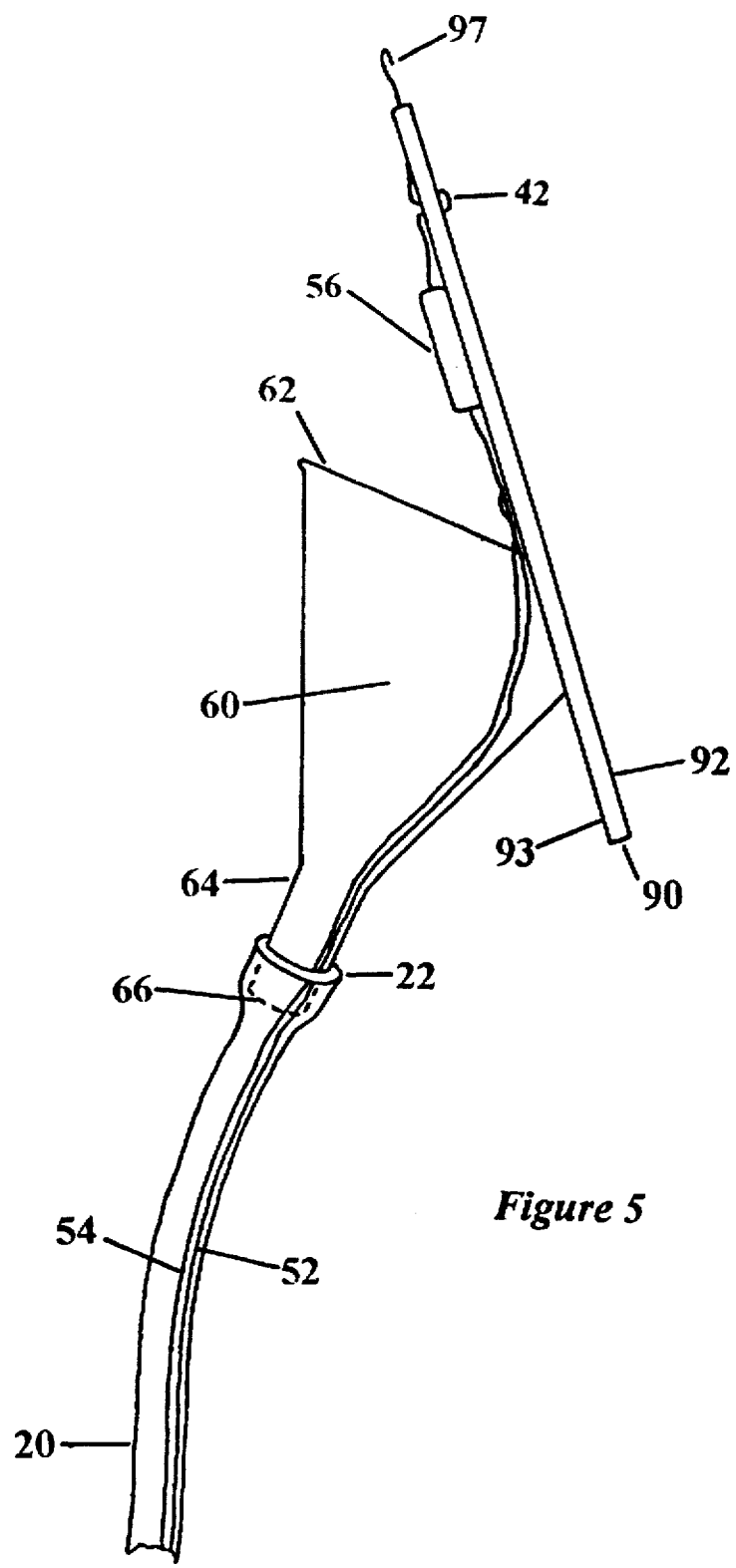
FIG. 5 shows a partial side view of the preferred embodiment of the cut plant watering apparatus.
Figure 6:
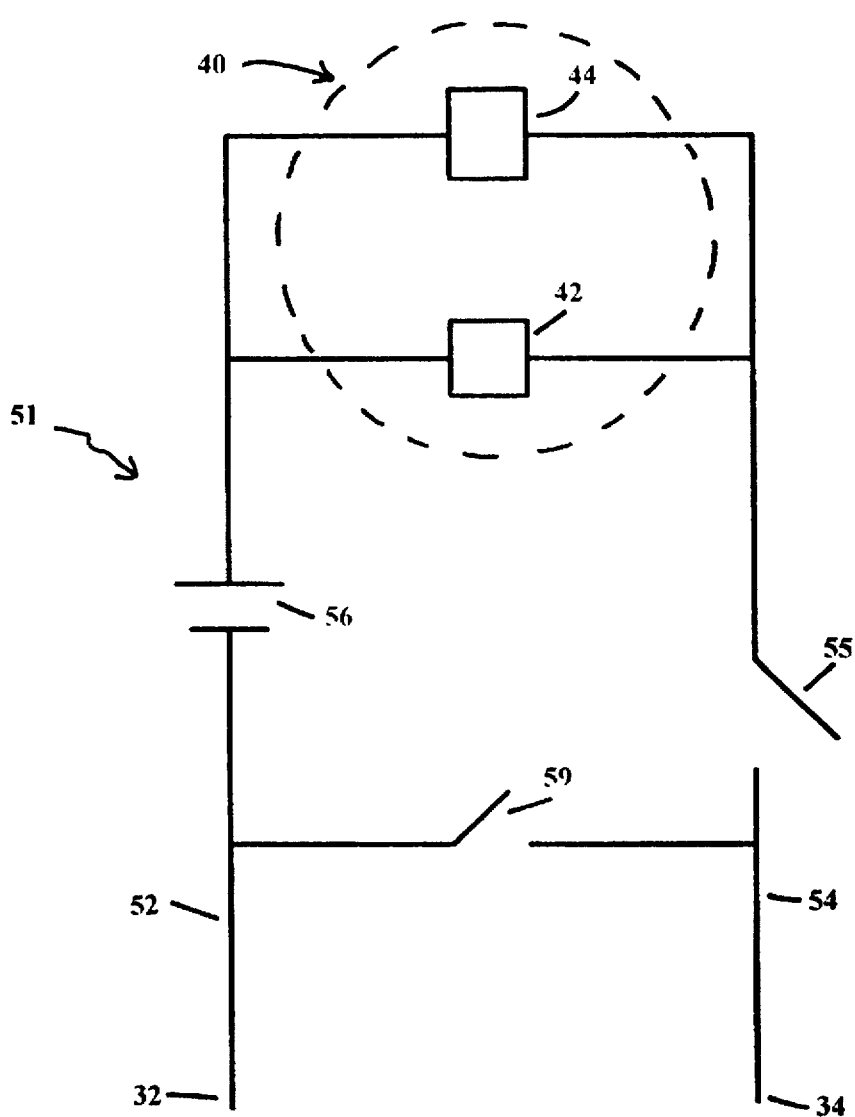
FIG. 6 shows an electrical circuit of a preferred embodiment of the present invention.
Figure 7:
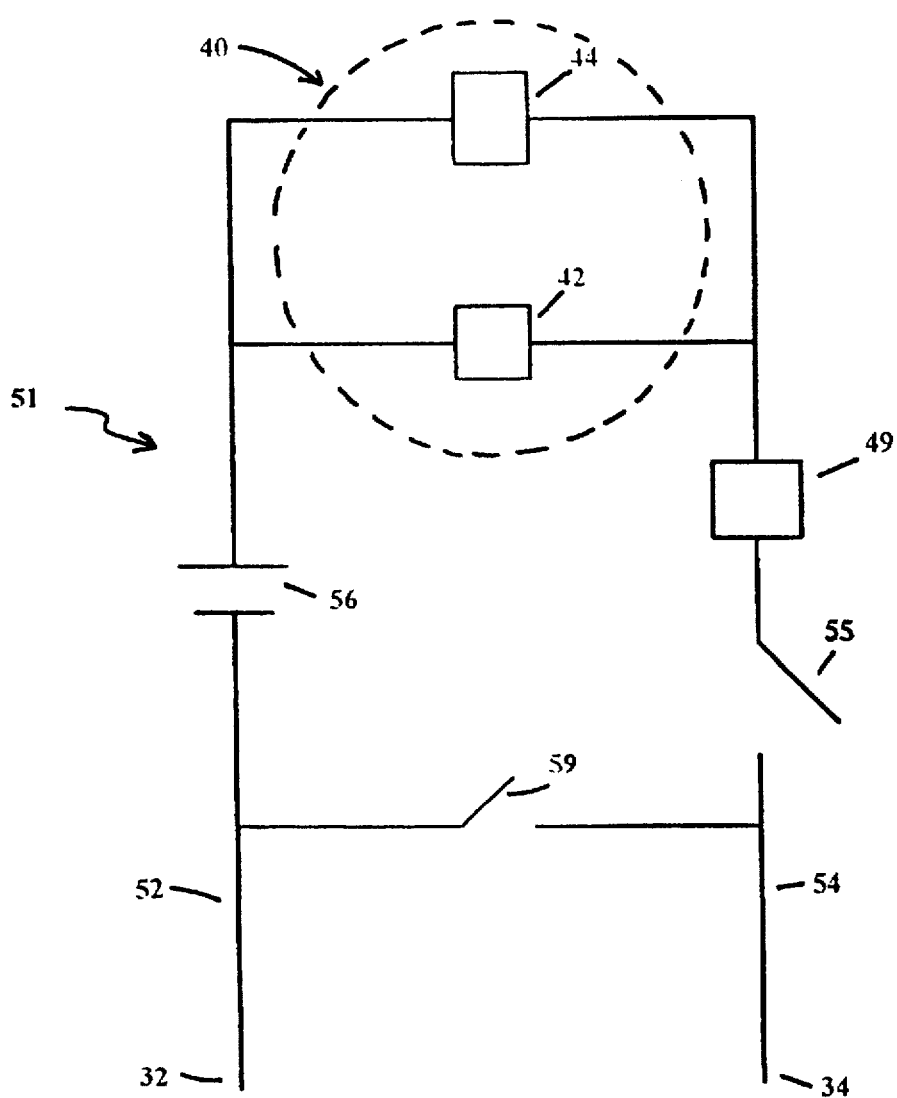
FIG. 7 shows a second embodiment of an electrical circuit which includes a timer.

In the preferred embodiment, electrical circuit 51 comprises a dc-power source 56 such as a battery, a fill level indicator 40 such as a lamp 42 or a piezo buzzer 44 or both as shown in FIGS. 4, 6 and 7, a fill level detector 30, and a manual switch 55 for manually opening circuit 51 to deactivate indicator 40 to conserve electrical energy once the water fill level has been reached. Circuit 51 can be used not only as a means to alert the user when to stop adding water, but manual switch 55 can be periodically closed to ascertain whether water needs to be added to container 420. If manual switch 55 is closed and the indicator 40 is not activated, this indicates to the user that water must be added because the water level in container 420 is not sufficiently high to bridge electrodes 32 and 34. The proper operation of circuit 51 requires that dc-power source 56 be operational. To test dc-power source 56, a normally open momentary switch 59 may be included. To test dc-power source 56, the user would close manual switch 55 and momentary switch 59, thereby shorting electrical circuit 51.

Figure 2:
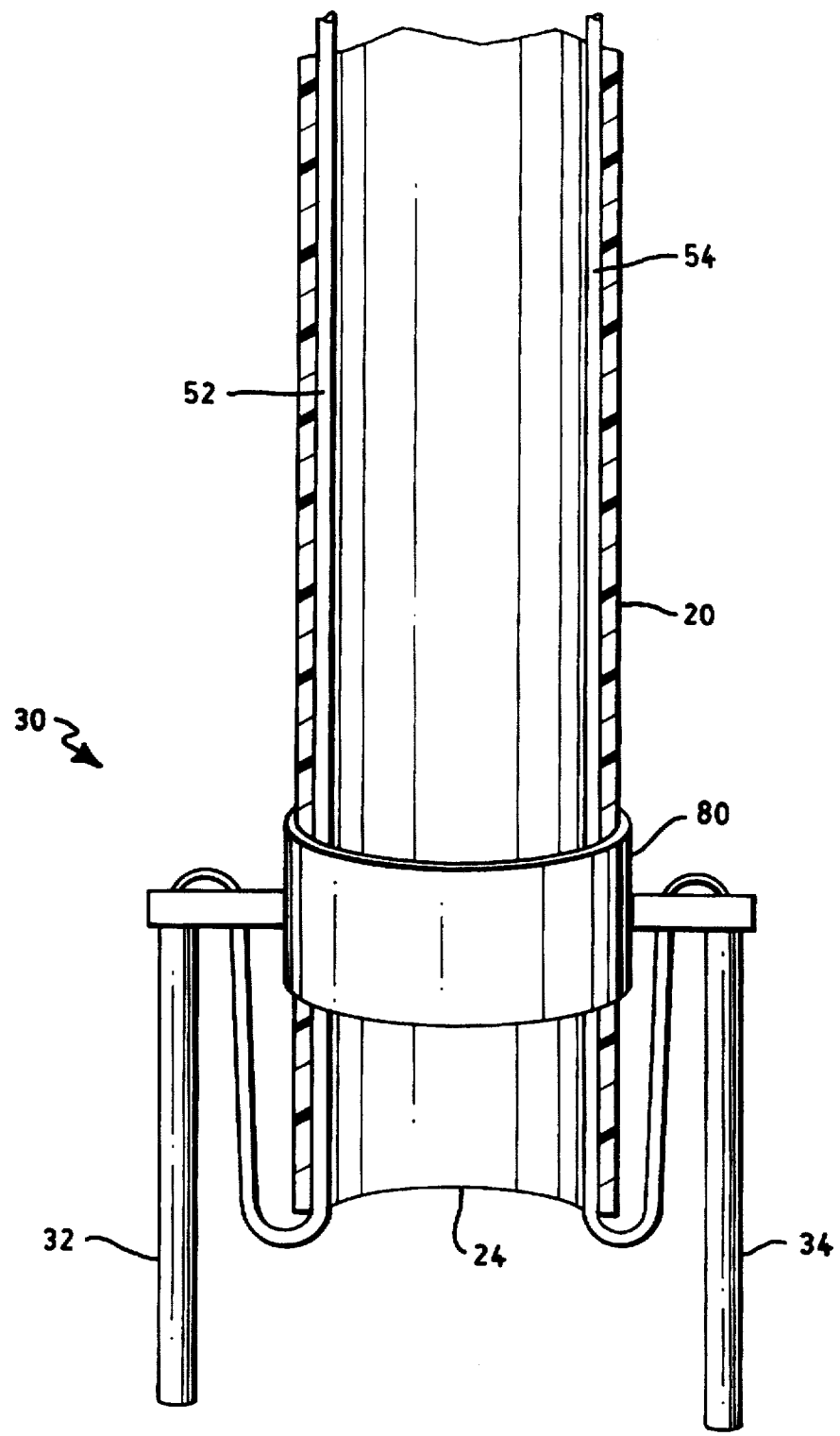
FIG. 2 is a detailed view of the fill level detector of the preferred embodiment of the cut plant watering apparatus.
Figure 3:
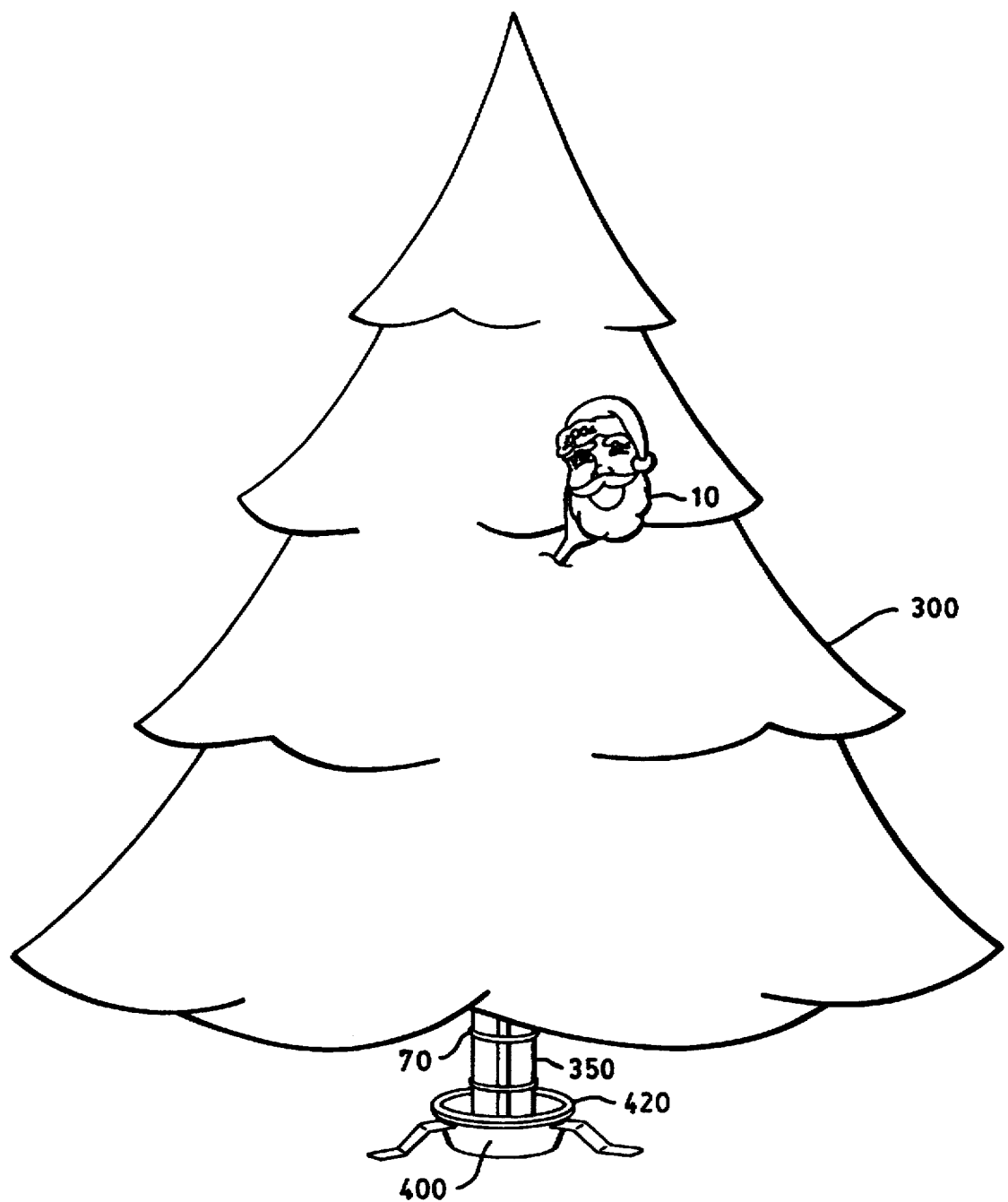
FIG. 3. is a view of the preferred embodiment of the cut plant watering apparatus installed in a Christmas tree.

Each of electrodes 32 and 34 is electrically incorporated into electrical circuit 51 via first electrical wire 52 and second electrical wire 54, respectively. As shown in FIG. 1 each of electrical wires 52 and 54 are routed inside conduit 20 and insulated to prevent shorting by water flowing through conduit 20. To ensure that electrodes 32 and 34 don't touch each other or become bridged by water as it passes through discharge end 24 of conduit 20 during filling, electrode spacer 80 is provided, as seen in FIGS. 1 and 2, and is preferably a plastic or ceramic insulator. Electrode spacer 80 retains primary electrode 32 and counter electrode 34 in a downwardly extending orientation and in spaced parallel alignment with one another and in spaced relationship with the outer surface of conduit 20.

Fastener 70, which is preferably a metal or plastic tie, band or clamp, is used to retain discharge end 24 of conduit 20 to trunk 350 of tree 300 and keep it aligned in container 420 to maintain fill level detector 30 at the desired height within container 420. It will be apparent to a person of ordinary skill in the art that any number of fasteners or fastener locations may be used; for example, a fastener connected to the side of container 420 or to tree stand 400 rather than to trunk 350 may be employed as long as discharge end 24 of conduit 20 is maintained within container 420 in a manner that allows it to perform the function desired and described. Also, it is not required that discharge end 24 and detector 30 be in contact with one another. For example, discharge end 24 and detector 30 could be maintained in their desired positions relative to container 420 by separate fasteners at different locations in or above container 420. Stated in terms of function, all that is required is that water 200 being discharged from discharge end 24 of conduit 20 be directed into container 420 and electrodes 32 and 34 of detector 30 be in an orientation that will cause them to be bridged by water 200 when water 200 has reached the desired level within container 420.

When water 200 contacts electrodes 32 and 34, electrical circuit 51 is completed so that fill level indicator 40, which may include a lamp 42, a piezo electric buzzer 44, and/or a sound module and a speaker, is activated thereby providing visual and/or audible indications that water 200 has reached the predetermined fill level. Furthermore, any audible or visual indicator, commonly known in the art, that is activated by an electric current may be used. Although not necessary, lamp 42 can be a standard LED or a blinking LED.

If a sound module is used, it may be programmed to produce an audible signal through a speaker to indicate when the desired water fill level is reached. Alternately, commonly available electronic music and voice modules typically used in greeting cards and toy novelties could be used.

Preferably support panel 90 is a decorative ornament made from an electrically insulating material such as plastic or wood.

Preferably funnel 60 is plastic while conduit 20 is rubber or flexible plastic tubing so that it can readily be guided around the branches and along trunk 350 of cut plant 300. Preferably funnel 60 and conduit 20 are green in color or translucent to blend into Christmas tree 300.

Electrodes 32 and 34 are preferably constructed from corrosion resistant metals such as stainless steel, but can simply be formed by stripping a small length of each of electrical wires 52 and 54 which are preferably solid single strand copper wire.

In a second embodiment, as shown in FIG. 7, electrical circuit 51 is modified to include a timer 49 such as an RC (resistor-capacitor) timing circuit as is known in the art so that fill level indicator 40 remains activated for a specified length of time, preferably 5 to 10 seconds, upon activation from fill level detector 30, after which the sound and/or lamp illumination would "time out" or cease, rather than remain active, thereby conserving electrical energy. Timing circuits are well known in the art and any such circuit may be designed and employed by one skilled in the art to perform the function described herein. Like the preferred embodiment, the second embodiment may include a manual switch 55 for manually opening and closing circuit 51. Manual switch 55 is closed when a user adds water to container 420. After fill level indicator 40 has been activated and timed-out as described, manual switch 55 may remain closed or be opened; in either event, the nature of the circuit is such that it will not continue to draw current. If manual switch 55 is opened and then closed while electrodes 32 and 34 are still bridged by water 200, then this will reset the circuit 51 for a new timing cycle which will last for the desired time as a function of resistance and capacitance as described previously. Manual switch 55 may be used to periodically test whether water 200 is needed in container 420, a function which was previously discussed in connection with the preferred embodiment. Furthermore, as with circuit 51 in the preferred embodiment, a normally open momentary switch 59 may be included to short circuit electrical circuit 51 to test dc-power source 56 in the same manner described in connection with the preferred embodiment.

FIG. 4 shows the preferred embodiment of cut plant watering apparatus 10 viewed from rear face 93 of support panel 90. Funnel 60 is fixedly or removably attached to rear face 93 of support panel 90. Funnel 60, preferably a frustro conical section, has a second open end 64 terminating in an open neck portion 66 to which fill end 22 of conduit 20 is sealably attached by friction, glue or conventional clamping means such as a hose clamp or the like. First open end 62 of funnel 60 is wider than second open end 64 of funnel 60. A hanger 97, such as a hook or loop, is attached to support panel 90 for attaching to a branch of cut plant 300. All components of electrical circuit 51 in the preferred embodiment and second embodiments, other than primary and counter electrodes 32 and 34 may be attached to rear face 93 of support panel 90 for convenience and aesthetic purposes, and furthermore, may be encased in a housing. In FIG. 4, the elements of circuit 51 are shown attached to rear face 93 and are exposed.

EXAMPLE

A working prototype was constructed in accordance with the invention disclosed herein and explained below.

A support panel in the form of an ornament was made from wood. A hook was attached to the top of the ornament for hanging on a Christmas tree limb. An opening large enough to conveniently pour water therethrough was cut through the face of the ornament. A plastic funnel approximately 4 inches in diameter by 5 inches in length was modified by removing a portion of the tapered frusto conical portion so that it could be conveniently mounted at an angle of approximately 45 degrees, using silicone rubber, to the rear face of the ornament. Approximately six feet of flexible translucent plastic tubing was used as a water conduit between the funnel and a Christmas tree stand water container. The tubing had an outer diameter of approximately $\frac{1}{2}$ inch and an inner diameter of approximately $\frac{5}{16}$ inch. The small end of the funnel was then inserted into the tubing and held in place by friction. A commonly available circuit board having a battery-operated electronic sound module with a speaker and a resistor-capacitor timing circuit was fixedly mounted to the rear face of the ornament. A lamp in the form of a blinking LED was incorporated into the circuit and made visible through a small hole cut into the ornament face. The LED and the sound module with speaker served as a fill level indicator to alert a user during the watering of a Christmas tree that the predetermined water fill level had been reached.

To activate the fill level indicator, a fill level detector was provided. Two lengths of single strand insulated copper wire, each approximately 6 feet long, were stripped of their insulation at each of their ends for installation into the fill level detector and the fill level indicator circuit. One stripped end of one wire served as a primary electrode and one stripped end of the other wire served as a counter electrode, each electrode for downward extension into the water container at the discharge end of the conduit. Each electrode was approximately $\frac{1}{2}$ inch in length, and was fixedly positioned in approximately parallel alignment and spaced approximately $\frac{3}{4}$ of an inch to 1 inch from the other electrode. With the electrode portion of each wire fixed at the discharge end of the conduit, each wire was routed from the conduit discharge end, through the interior of the conduit, through the inside of the funnel and terminated on the circuit board, where it was electrically connected to the circuit, on the rear face of the ornament. It was apparent to the inventors that if the stripped ends of the wires were within, or too close to, the discharge end, they would be prematurely bridged by water passing through the conduit, thereby giving the user a false "full reading." The problem was avoided by the design described as follows. To prevent unintended electrical shorting between the electrodes at the discharge end of the conduit during filling, and before the intended fill level had been attained, the insulated portion of each wire was fed through the discharge end and bent in hairpin fashion up the outer surface of the conduit where it was secured in place with a ring fastener fitted around the outer surface of the conduit. Each wire was then bent again in hairpin fashion and oriented downwardly along the outer surface of the fastening ring and the outer surface of the conduit where it extended downwardly to a stripped portion (the electrode) just below the discharge end and in spaced relationship with the discharge end. Specifically, each stripped end (electrode) was spaced approximately ⅓ of an inch away from the outer surface of the conduit, was spaced about 1 inch apart from the other electrode, and extended about ⅛ to ¼ inch below the discharge end of the conduit.

Having constructed a cut plant watering apparatus according to the instant invention, the apparatus was first tested by shorting the two electrodes with a nail. The sound module and blinking LED were activated and then timed out after approximately 5 to 10 seconds; the circuit shut off even though the nail was still contacting the electrodes. The sound and lamp indicators then remained inactive until the nail was removed and again put in electrical contact with the electrodes, resetting the timing circuit, at which time the cycle repeated itself as intended.

Next, the apparatus was tested by inserting the electrodes into a glass of water. It was found that when the electrodes contacted the water, the unit successfully operated in a manner similar to the initial test.

Finally, the apparatus was installed, using the hook, on a live cut Christmas tree limb which was mounted on a Christmas tree stand having a container for receiving water. The ornament was oriented so that its front face was readily accessible at a convenient height above the floor and near the outer perimeter of the Christmas tree. The flexible conduit was routed from the funnel and ornament assembly toward the tree trunk and vertically downward toward the floor. The discharge end of the conduit was secured to the tree trunk with a fastener in the form of a plastic tie. This allowed the electrodes to be set at a predetermined height (approximately 1 inch below the top of the container).

After installing the apparatus on a Christmas tree as described, water was manually poured into the opening in the ornament and into the funnel and was carried to the container via the conduit. Filling continued until the rising water level contacted the electrodes. When this occurred, the sound module and blinking LED, and associated timing circuit, were activated for a period of time, as desired, thereby alerting the user to cease filling since the desired water fill level was reached. The electrodes were positioned at a point below the intended water fill level for two reasons. First, a person using the device requires sufficient time to react to the signal during which time the user may still be pouring water into the conduit and, second, even assuming that a person was able to react to the indicator instantaneously, there will still be a quantity of water at least as large as the volume of the conduit that must be accommodated by the container after the indicator has been activated. Failure to make such allowance could result in overflow.

Although specific features of this invention are shown in some drawings and not others, this is for convenience only, as some feature may be combined with any or all of the other features in accordance with this invention. For instance, the instant invention could also be adapted for use to measure a low water condition by incorporating a separate low level detector and low level indicator similar to those disclosed herein.

The foregoing is considered as illustrative only of the principles of the invention. Furthermore, since numerous modifications and changes will readily occur to those skilled in the art, it is not intended that the foregoing limit the invention to the exact construction and operation shown and described. Accordingly, all suitable modifications and equivalents may be resorted to that appropriately fall within the scope of the invention. Other embodiments therefore will occur to those skilled in the art and are within the scope of the following claims:

What is claimed is:

1. A cut plant watering apparatus comprising:

a conduit having a fill end and a discharge end for carrying water from a remote location to a container for receiving the cut end of a plant for submersion within the water;

a funnel having a first open end and a second open end, said first open end being wider than said second open end, said second open end terminating in an open neck portion for sealable engagement with said fill end of said conduit;

a fastener for retaining said discharge end so that water discharging from said discharge end is directed into the container;

an electrical indicator circuit having an electrical power source electrically connected to a fill level detector responsive to the water's reaching a predetermined level in the container during filling and a fill level indicator electrically connected to said detector for indicating to a user of the apparatus when the water has reached a predetermined level in said container during filling; and a support panel having a front face, a rear face, and an opening therethrough from said front face to said rear face, said rear face being fixedly attached to said first open end of said funnel so that said opening in said panel is in alignment with said first open end of said funnel and water can be poured through said opening into said funnel, said panel further having a hanger for hanging said panel from the cut plant at a point higher than the container.

2. The cut plant watering apparatus of claim 1 wherein said detector comprises a primary electrode and a counter electrode both operatively incorporated within said electrical indicator circuit and downwardly extending into the container for contact with the water as the water level rises during the filling process so that when both said electrodes come in contact with the water, the water bridges said electrodes and said electrical indicator circuit is closed thereby activating said indicator.

3. The cut plant watering apparatus of claim 2 wherein said electrical indicator circuit further comprises a manual switch for alternately opening and closing said electrical indicator circuit when said electrodes are bridged by the water.

4. The cut plant watering apparatus of claim 3 further comprising a timer within said electrical indicator circuit so that said indicator remains active for a specific duration sufficient to indicate to the user that the water has reached the predetermined fill level and then becomes inactive even though said electrodes remain in contact with the water bridging said electrodes so that said indicator does not remain active and continue to draw electrical current.

5. The cut plant watering apparatus of claim 2 wherein said electrical indicator circuit further comprises a momentary switch connected to said electrical indicator circuit for testing said electrical power source.

6. The cut plant watering apparatus of claim 2 wherein said electrical indicator circuit further comprises a manual switch for alternately opening and closing said electrical indicator circuit when said electrodes are bridged by the water.

7. The cut plant watering apparatus of claim 2 further comprising a timer within said electrical indicator circuit so that said indicator remains active for a specific duration sufficient to indicate to the user that the water has reached the predetermined fill level and then becomes inactive even though said electrodes remain in contact with the water bridging said electrodes so that said indicator does not remain active and continue to draw electrical current.

8. The cut plant watering apparatus of claim 2 wherein said electrical indicator circuit further comprises a momentary switch connected to said electrical indicator circuit for testing said electrical power source.

9. The cut plant watering apparatus of claim 1 wherein said conduit is constructed from flexible material.

10. A cut plant watering apparatus comprising:

a flexible conduit having a fill end and a discharge end for carrying water from a remote location to a container for receiving the cut end of a plant for submersion within the water;

a funnel having a first open end and a second open end, said first open end being wider than said second open end, said second open end terminating in an open neck portion for sealable engagement with said fill end of said flexible conduit;

a fastener for retaining said discharge end so that water discharging from said discharge end is directed into the container;

an electrical indicator circuit having an electrical power source electrically connected to a fill level detector responsive to the water's reaching a predetermined level in the container during filling and a fill level indicator electrically connected to said detector for indicating to a user of said apparatus when the water has reached a predetermined level in the container during filling, said detector comprising a primary electrode and a counter electrode both operatively incorporated within said electrical indicator circuit and downwardly extending into the container for bridging by the water so that said electrical indicator circuit is closed thereby activating said indicator; and a support panel having a front face, a rear face, and an opening therethrough from said front face to said rear face, said rear face being fixedly attached to said first open end of said funnel so that said opening in said panel is in alignment with said first open end of said funnel and water can be poured through said opening into said funnel, said panel further having a hanger for hanging said panel from the cut plant at a point higher than the container.

11. The cut plant watering apparatus of claim 10 wherein said electrical indicator circuit further comprises a manual switch for alternately opening and closing said electrical indicator circuit when said electrodes are bridged by the water.

12. The cut plant watering apparatus of claim 11 wherein said electrical indicator circuit further comprises a timer within said electrical indicator circuit so that said indicator remains active for a specific duration sufficient to indicate to the user that the water has reached the predetermined fill level and then becomes inactive even though said electrodes remain in contact with the water bridging said electrodes so that said indicator does not remain active and continue to draw electrical current.

13. The cut plant watering apparatus of claim 12 further comprising a momentary switch connected to said electrical indicator circuit for testing said electrical power source.

* * * * *